March 25, 1969   J. A. TANKERSLEY   3,434,899
LAMINATED COUPLING

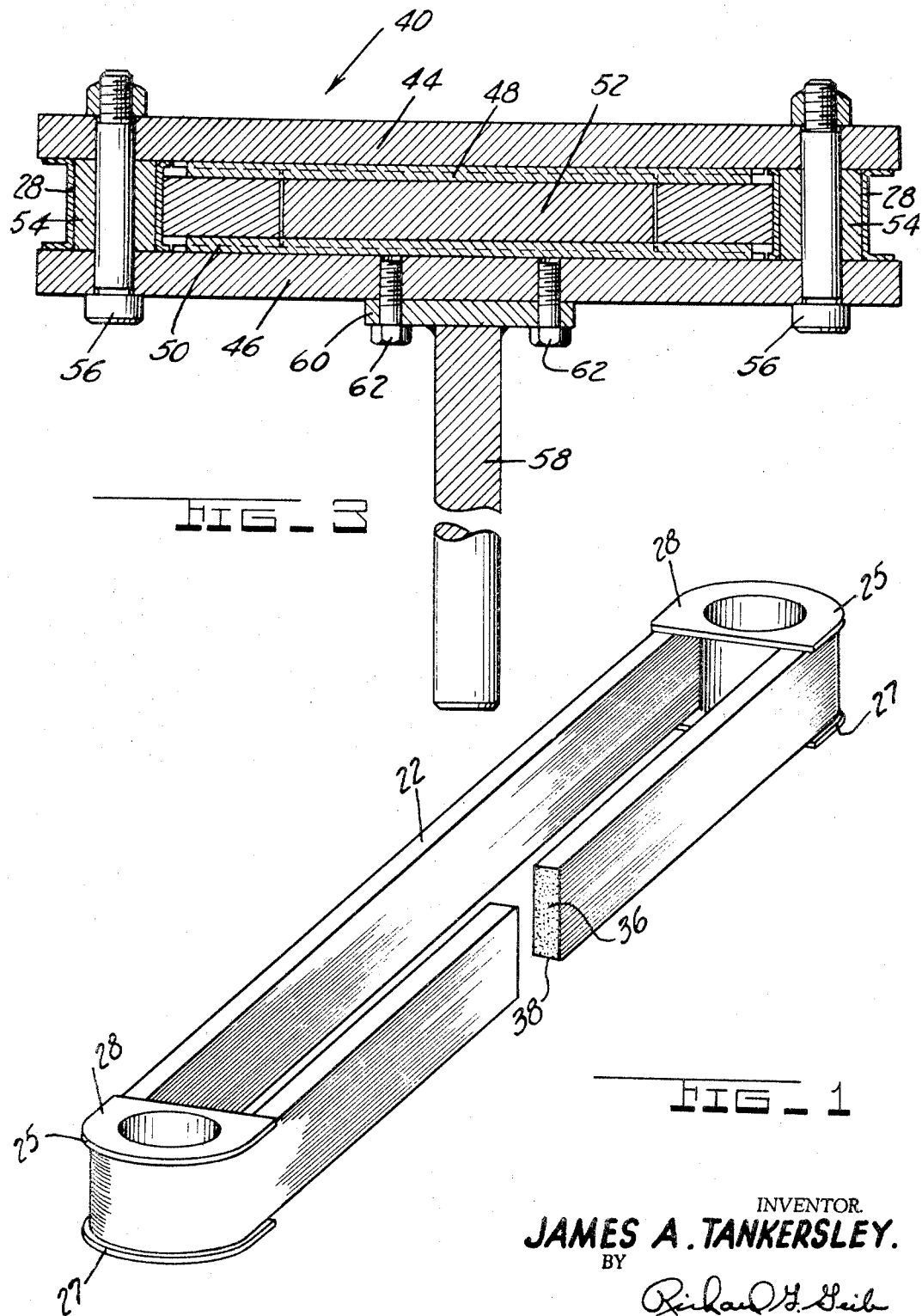

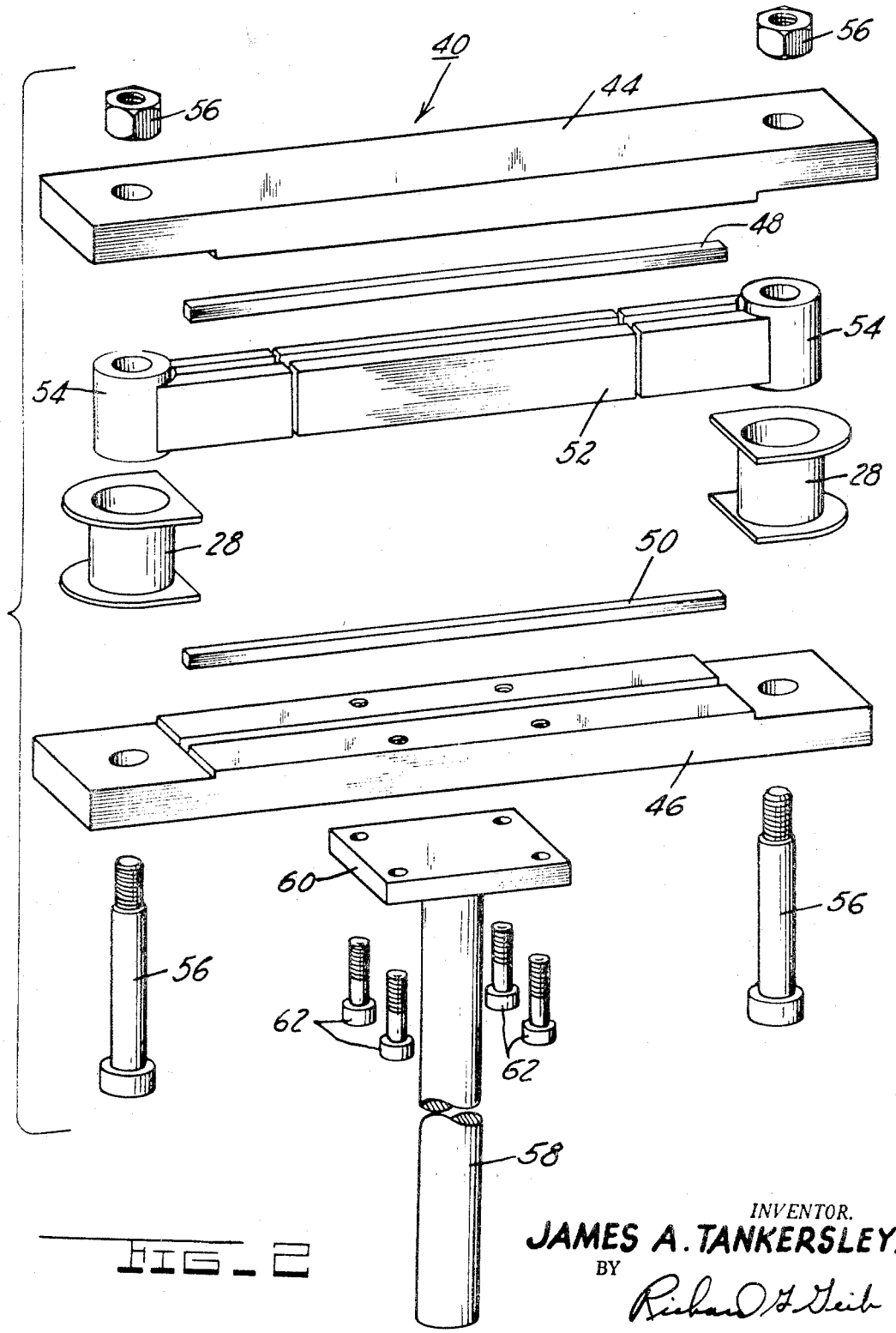

Filed Oct. 15, 1965   Sheet 3 of 3

INVENTOR.
JAMES A. TANKERSLEY.
BY
Richard G. Geib
ATTORNEY

United States Patent Office 3,434,899
Patented Mar. 25, 1969

3,434,899
LAMINATED COUPLING
James A. Tankersley, South Bend, Ind., assignor to The Bendix Corporation, a corporation of Delaware
Original application Nov. 6, 1961, Ser. No. 150,455. Divided and this application Oct. 15, 1965, Ser. No. 496,429
Int. Cl. B65h 81/00; B31c 13/00
U.S. Cl. 156—172         2 Claims The present invention relates in general to a force transmitting member, and, in particular, to a light-weight structural member capable of sustaining high tensile end loads while subjected to torsional oscillation about an axis in line with the application of said end load. Ths application is a divisional application from my parent application Ser. No. 150,455 filed Nov. 6, 1961.

It has been the practice to make structures subject to high tensile and torsional loadings, such as, for example, the connecting members between helicopter rotor blades and their driving rotor, from a plurality of metal pieces of substantial length and width. Such structures, particularly where used between helicopter blades and their driving rotor, have created numerous problems some of which are excessive weight, short operating life, maintenance and a lack of uniformity in manufacture.

Accordingly, it is an object of this invention to provide a method of construction for a connection that will eliminate the above-mentioned problems by providing a laminated coupling that will have sufficient tensile strength and torsional flexure without the creation of undue stresses by binding of any of the internal filaments within such composite structure and which method is economically practical.

Other objects and many attendant advantages of this invention will be readily appreciated as the same becomes better understood by reference to the following detailed description when considered in connection with the accompanying drawings:

FIGURE 1 is a partially section perspective view of a laminated coupling manufactured in accordance with the methods set forth by this invention;

FIGURE 2 is an exploded view with the parts in perspective showing a prepared fixture for manufacturing a laminated coupling as shown in FIGURE 1;

FIGURE 3 is a sectionalized view of the assembled fixture of FIGURE 2; and

Figure 4:
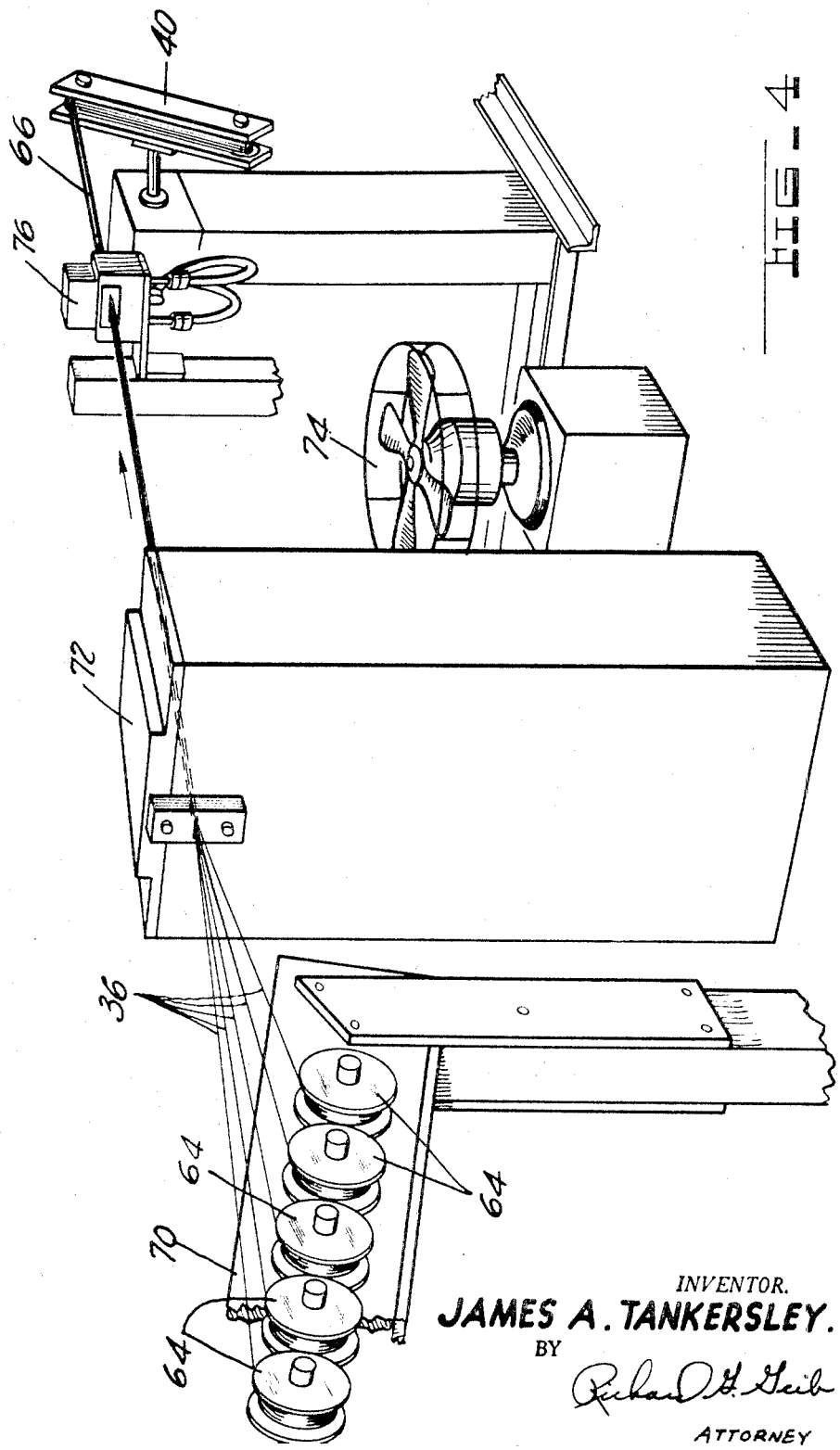
FIGURE 4 is a schematic of a preferred arrangement of the apparatus to be used in making a laminated coupling in accordance with the method of the subject invention.

With more particular reference to FIGURE 1 there is shown a laminated coupling 22 formed from a plurality of filaments 36 which may have most any geometrical cross section such as round or rectangular. The filaments 36 are individually coated with an elastomeric substance 38 which is further utilized to bond the filaments in a taped configuration which is used in the method hereinbelow as well as to enclose the laminated coupling assembly by a process that is further described in the method set forth herebelow.

Before passing on to this method of construction for the laminated coupling 22 it should be noted that at each end of the coupling there are provided bushings 28 that have upper and lower flanges 25 and 27, respectively, which serve to transmit torsional loading to the coupling 22 and also prescribe the height of the coupling. Also it should be noted that the elastomeric substance should be chosen from resin compounds which possess tensile and torsional characteristics that resist separation of the filaments enclosed and bonded thereby. This is necessitated by the requirements and function of said substance as applied to the coupling 22 in that the filaments 36 must be separated from one another to prevent local stress build-up which would occur when one filament comes into contact with another; and, as the wires must be permitted to flex, the substance 38 must be deformable without exceeding the elastic limit. Thus various semi-solid compounds may be utilized for the substance 38 according to the operating environment of the coupling 22.

The equipment employed in connection with the process for manufacturing the coupling essentially comprises a fixture 40 (see FIGURES 2 and 3) having an upper plate 44 and a lower plate 46 adapted to receive keys 48 and 50, respectively, for establishing alignment of the collapsible bar 52 centrally of the plates 44 and 46. The fixture 40 also holds the end connection means, such as the bushings 28, at the ends of the plates by cylindrical bushings 54, as seen in FIGURE 4, which also center the bushings 28 so that the collapsible bar 52 is faired into the walls of the bushings 28 and no wider at any point than the bushing diameter nor higher than the bushing dimension between the flanges 25 and 27. Further details as to the construction of this fixture show the plates 44 and 46 being thereafter joined by fastener 56, which in this case is shown as a bolt and nut, and the fixture is mounted to a shaft 58 through a plate 60 by bolts 62, the shaft 58 being mounted for rotation to a power means (not shown).

Preparatory to wrapping of the laminated coupling about the bushings, the fixture 40 and all of the surfaces that may come into contact with the wet elastomeric substance is coated with a parting agent which may take the form of a Teflon coating to insure removal of the coupling 22 after it is formed.

Thereafter, the filaments 36 are pulled off uniformly rotatable spools 64 (see FIGURE 5) having ends thereof arranged in a parallel relationship and attached to one of the bushings 28 after being wrapped around the bushing part of one or more turns so that the ends of said filaments are centrally located along the axis of said coupling 22 to prevent the lapping thereof by succeeding wraps of the tape 66.

With respect to manufacturing the laminated coupling, the fixture 40 containing the filaments is rotated drawing the filaments 36 off the uniformly rotatable spool 64 mounted on a rack 70. The number of spools 64 containing the filaments 36 is determined by the number of filaments required which in turn depends upon the desired tensile strength of the unit that is determined by the conditions of its operating environment. As seen in FIGURE 4 illustrating one arrangement of the method suggested by this invention, the rack 70 may be angularly disposed. However, the rack 70 may also assume other positions only limited by the fact that the filaments must emerge from the spools so that they will not become entangled with one another.

As the filaments 36 are drawn from the spools 64 they are gathered together at the entrance of a cleaning tank 72 and drawn through a vapor cleansing stream (not shown) within the tank 72 from which they emerge free of such impurities, as oil or the like, that would prevent binding of the resin thereto.

The cleansed filaments are then drawn through a drying area subjected to forced air from a fan 74. The filaments 36 which are now in a substantial parallel and horizontal alignment, are drawn through a resin tank 76 containing an elastomeric substance 38. This coats each filament and bonds them together in spaced relation, which relationship is determined by the amount of resin allowed to adhere to the filaments.

From the resin tank the tape 66 formed of the several filaments having the elastomeric substance 38 therebetween and therearound, which is as yet in a plastic state, is wrapped around the bushings 28 within the fixture 40 until a sufficient laminate thickness is reached to provide a unit of desired tensile and torsional strength.

When the desired thickness is built up, the coated and bonded tape is cut and clamped by a C clamp to the underlying layer until the resin has set enough to hold the end securely in position. Thereafter, the laminated coupling is enclosed by an application of the aforementioned resin formed of an elastomeric substance, as by painting, dipping, etc., to provide a smooth outer contour which also affords protection in handling the coupling, and the resin coated laminated coupling 22 is then subjected to a cure process that involves allowing the enclosed belt assembly to set at room temperature or to place the belt assembly in an oven (not shown) to rapidly cure the elastomeric substance.

One construction which has been utilized so far was providing the spools 64 with very thin circular cross-section wire filaments which due to the predicted utilization for the coupling had a tensile strength in excess of 600,000 p.s.i. and were bonded and spaced by a polyurethane compound having a tensile strength of 4,000 p.s.i., a modulus of 2,100 p.s.i., and a durometer of 80. In this environment the coupling withstood simultaneous tension and torsional loads producing combined stresses in excess of 500,000 p.s.i. Such a coupling was fabricated according to the present invention with a forty percent (40%) savings in weight over any similar coupling construction in accordance with the teachings known in the prior art for operation in a similar loading requirement.

While one embodiment specifically has been shown herein and described, it is apparent that many changes and modifications may be made that lie within the scope of the invention. Therefore, I do not intend to be limited by the embodiment described herein, but only by the appended claims.

What is claimed is:
1. A method of manufacture of an endless coupling of tape of parallel arranged filaments comprisng the steps of:
   placing a pair of flanged bushings on a plate;
   placing an alignment key on the said plate between the bushings;
   placing a collapsible bar over the alignment key between the bushings such that the sides of the bar have a width substantially equal to the diameter of the bushings and are faired into the walls of the bushings;
   placing another alignment key on top of the last collapsible bar between the bushings;
   assembling an upper plate to the lower plate by means of bolts through the bushings that are tightened to hold the collapsible bar in place between the two bushings;
   connecting the assembled upper and lower plates to a revolvable means;
   mounting a plurality of filament spools for free and uniform rotation;
   drawing the filaments from each of the filament spools simultaneously in a parallel arrangement each to the other through a cleansing medium;
   drawing the cleansed filaments while maintaining them in parallel relationship through a drying medium;
   drawing said parallel arranged filaments through a resin tank to coat and maintain an elastomeric substance between the parallel arranged filaments and bond them therefore into a tape configuration;
   attaching the end of the tape emerging from the elastomeric substance to one of the said bushings;
   rotating said shaft to wrap the tape of parallel arranged filaments around each of said bushings to cause further drawing of the filaments from the spools in the manner aforesaid;
   cutting of said tape adjacent one of said bushings;
   clamping the cut end of said tape to the next underlying layer to bond it thereto;
   removing the bolts and said upper plate to remove the bushings with the tapes wrapped therearound from the lower plate while at the same time removing the collapsible bar structure;
   applying an elastomeric substance to the exterior surfaces of the assembly of tape and bushings; and
   curing the elastomeric substance applied to the exterior surface of the bushings and enclosing tapes.

2. A method of making an endless girding structure of elastomeric coated filaments comprising the steps of:
   drawing said filaments from uniformly rotating spools through a cleansing means and a drying means;
   drawing said filaments through a resin tank to coat and arrange each of said filaments parallel to each other in a tape configuration;
   attaching an end of the tape configuration to one of two spaced flanged bushings in a rotatable fixture while the elastomeric coating is in a plastic state;
   rotating said fixture to wrap the tape configuration about each of the bushings between the flanges therof while the elastomeric coating is in the plastic state to affix said tape configuration to said bushings;
   cutting said tape configuration of filaments when a sufficient number of layers thereof have been affixed to said bushings;
   bonding the loose end of said tape configuration of filaments to the next underlying layer;
   enclosing the lamination of tapes on the bushings by application of an additional amount of the substance in said resin tank thereover; and
   curing the lamination of tapes and bushings to withdraw the solvents from the elastomeric substance bonding the filaments to the bushing and to each other.

References Cited

UNITED STATES PATENTS

| | | | |
|---|---|---|---|
| 2,980,158 | 4/1961 | Meyer | 156—433 X |
| 3,025,205 | 3/1962 | Young | 156—169 |
| 3,032,459 | 5/1962 | Uhleen | 156—321 X |
| 3,056,706 | 10/1962 | Knoppel | 156—159 X |
| 3,057,767 | 10/1962 | Kaplan | 156—172 |
| 3,080,268 | 3/1963 | Bjork | 156—172 X |

EARL M. BERGERT, *Primary Examiner.*

D. L. FRITSCH, *Assistant Examiner.*

U.S. Cl. X.R.

170—159